(12) United States Patent
Nakamura (10) Patent No.: US 10,108,865 B2
(45) Date of Patent: Oct. 23, 2018

(54) INFORMATION CALCULATION DEVICE

(71) Applicant: TOYOTA JIDOSHA KABUSHIKI KAISHA, Toyota-shi, Aichi-ken (JP)

(72) Inventor: Hiroshi Nakamura, Gotemba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 8 days.

(21) Appl. No.: 15/380,008

(22) Filed: Dec. 15, 2016

(65) Prior Publication Data

US 2017/0177952 A1   Jun. 22, 2017

(30) Foreign Application Priority Data

Dec. 16, 2015   (JP) .................................. 2015-245616

(51) Int. Cl.
| | |
|---|---|
| *H04N 7/18* | (2006.01) |
| *G06K 9/00* | (2006.01) |
| *G06T 7/13* | (2017.01) |
| *B60R 11/04* | (2006.01) |

(52) U.S. Cl.
CPC .......... *G06K 9/00798* (2013.01); *B60R 11/04* (2013.01); *G06T 7/13* (2017.01); *G06T 2207/10004* (2013.01); *G06T 2207/30256* (2013.01)

(58) Field of Classification Search
CPC ....... G06K 9/00798; B60R 11/04; G06T 7/13; G06T 2207/30256; G06T 2207/10004
See application file for complete search history.

(56) References Cited

U.S. PATENT DOCUMENTS

| | | | |
|---|---|---|---|
| 2002/0042668 A1 | 4/2002 | Shirato et al. | |
| 2004/0183663 A1* | 9/2004 | Shimakage | .......... B62D 15/029 340/436 |
| 2005/0270374 A1* | 12/2005 | Nishida | ................ G05D 1/0246 348/148 |

(Continued)

FOREIGN PATENT DOCUMENTS

| | | |
|---|---|---|
| JP | 2002109695 A | 4/2002 |
| JP | 2004-268845 A | 9/2004 |

(Continued)

OTHER PUBLICATIONS

Akihiro Watanabe et al., "Lane detection with roadside structure using on-board monocular camera", Intelligent Vehicle Symposium, 2009 IEEE, Jun. 2009, pp. 191-196.

*Primary Examiner* — Tat C Chio
(74) *Attorney, Agent, or Firm* — Sughrue Mion, PLLC (57) ABSTRACT

An information calculation device includes an ECU configured to specify right and left lane marker candidate points based on edge points in the captured image, and configured to, when two edge points satisfying separation conditions are included in each of the right and left lane marker candidate points, calculates a lateral position of the vehicle, a pitch angle, a yaw angle, a lane width of a traveling lane, a curvature, and a curvature change rate by Kalman filter processing. The ECU is configured to calculate the pitch angle to be zero and the lane width to be a predetermined value when the two edge points satisfying the separation conditions are included in one of the right and left lane marker candidate points and no edge point is included in the other lane marker candidate points.

7 Claims, 7 Drawing Sheets

(56) References Cited

U.S. PATENT DOCUMENTS

2010/0189306 A1* 7/2010 Kageyama ......... G06K 9/00798
                                                    382/104
2015/0269445 A1* 9/2015 Ueda ................. G06K 9/00798
                                                    348/118

FOREIGN PATENT DOCUMENTS

| JP | 2015-069292 A | 4/2015 |
| JP | 2015-179368 A | 10/2015 |

* cited by examiner

INFORMATION CALCULATION DEVICE

INCORPORATION BY REFERENCE

The disclosure of Japanese Patent Application No. 2015-245616 filed on Dec. 16, 2015 including the specification, drawings and abstract is incorporated herein by reference in its entirety.

BACKGROUND

1. Technical Field

The present disclosure relates to an information calculation device.

2. Description of Related Art

A device which calculates information relating to a traveling lane based on a captured image of the traveling lane of a vehicle captured by a camera mounted in the vehicle is disclosed in, for example, Japanese Patent Application Publication No. 2002-109695 (JP 2002-109695 A). In this publication, a traveling road recognition device which extracts edge points from the captured image in front of the vehicle by edge processing and detects edge point satisfying predetermined conditions as lane marker candidate points corresponding to right and left white lines of the traveling lane is described. This traveling road recognition device calculates information relating to the traveling lane, such as a road curvature, from coordinate values of the right and left lane marker candidate points on the captured image using an extended Kalman filter.

SUMMARY

However, in the device of the related art described above, it is assumed that each of the right and left lane marker candidate points of the traveling lane includes a plurality of edge points sufficiently separated from one another, and in a case where one of the right and left lane marker candidate points does not include a plurality of edge points sufficiently separated from one another, there is a problem in that it is not possible to appropriately execute calculation using an extended Kalman filter and to acquire information relating to a traveling lane to be requested.

The present disclosure provides an information calculation device capable of appropriately calculating information relating to a traveling lane even in a case where one of right and left lane marker candidate points of the traveling lane does not include a plurality of edge points sufficiently separated from one another.

An information calculation device according to a first aspect of the disclosure is an information calculation device which calculates information relating to a traveling lane where a vehicle travels based on a captured image in front of the vehicle captured by a monocular camera mounted in the vehicle. The information calculation device includes an electronic control unit configured to i) detect edge points in the captured image, ii) specify left lane marker candidate points as the edge points of a lane marker on a left side of the vehicle in the traveling lane and right lane marker candidate points as the edge points of a lane marker on a right side of the vehicle in the traveling lane based on the edge points, and iii) calculate a lateral position of the vehicle in the traveling lane, a pitch angle of the vehicle with respect to the traveling lane, a yaw angle of the vehicle with respect to the traveling lane, a lane width of the traveling lane, a curvature of the traveling lane in front of the vehicle, and a curvature change rate as a rate of change of the curvature based on the right lane marker candidate points and the left lane marker candidate points by Kalman filter processing determined in advance in a case where two edge points satisfying separation conditions set in advance are included in each of the right lane marker candidate points and the left lane marker candidate points. The electronic control unit is configured to set the pitch angle of the vehicle to zero and to set the lane width of the traveling lane to a predetermined value and to calculate the lateral position, the yaw angle, the curvature, and the curvature change rate based on one of the right lane marker candidate points and the left lane marker candidate points by the Kalman filter processing in a case where the two edge points satisfying the separation conditions are included in one of the right lane marker candidate points and the left lane marker candidate points and no edge point is included in the other lane marker candidate points.

According to the above-described aspect, even in a case where the two edge points satisfying the separation conditions set in advance are not included in each of the right lane marker candidate points and the left lane marker candidate points, when the two edge points satisfying the separation conditions are included in one of the right lane marker candidate points and the left lane marker candidate points and no edge point is included in the other lane marker candidate points, the Kalman filter processing is executed by applying a constraint condition for which the pitch angle of the vehicle is set to zero and the lane width of the traveling lane is set to the predetermined value. Therefore, according to this information calculation device, even in a case where one of the right lane marker candidate points and the left lane marker candidate point can specify no edge point, it is possible to appropriately calculate information relating to the traveling lane.

An information calculation device according to a second aspect of the disclosure is an information calculation device which calculates information relating to a traveling lane where a vehicle travels based on a captured image in front of the vehicle captured by a monocular camera mounted in the vehicle, and includes an electronic control unit configured to i) detect edge points in the captured image, ii) specify left lane marker candidate points as the edge points of a lane marker on a left side of the vehicle in the traveling lane and right lane marker candidate points as the edge points of a lane marker on a right side of the vehicle in the traveling lane based on the edge points, and iii) calculate a lateral position of the vehicle in the traveling lane, a pitch angle of the vehicle with respect to the traveling lane, a yaw angle of the vehicle with respect to the traveling lane, a lane width of the traveling lane, a curvature of the traveling lane in front of the vehicle, and a curvature change rate as a rate of change of the curvature based on the right lane marker candidate points and the left lane marker candidate points by Kalman filter processing determined in advance in a case where two edge points satisfying separation conditions set in advance are included in each of the right lane marker candidate points and the left lane marker candidate points. The electronic control unit is configured to set the pitch angle of the vehicle to zero and calculate the lateral position, the yaw angle, the lane width, the curvature, and the curvature change rate based on the right lane marker candidate points and the left lane marker candidate points by the Kalman filter processing in a case where the two edge points satisfying the separation conditions are included in one of the right lane marker candidate points and the left lane marker candidate points, at least one edge point is included in the other lane marker candidate points, and all edge points in the other lane marker candidate points do not satisfy the separation conditions.

In the information calculation device according to the second aspect of the disclosure, even in a case where the two edge points satisfying the separation conditions set in advance are not included in each of the right lane marker candidate points and the left lane marker candidate points, when the two edge points satisfying the separation conditions are included in one of the right lane marker candidate points and the left lane marker candidate points, at least one edge point is included in the other lane marker candidate points, and all edge points in the other lane marker candidate points do not satisfy the separation conditions, the Kalman filter processing is executed by applying a constraint condition for which the pitch angle of the vehicle is set to zero. Therefore, according to this information calculation device, even in a case where the two edge points satisfying the separation conditions are not included in one of the right lane marker candidate points and the left lane marker candidate points where at least one edge point is specified, it is possible to appropriately calculate information relating to the traveling lane.

As described above, with the information calculation device according to the first and second aspects of the disclosure, even in a case where one of the right and left lane marker candidate points of the traveling lane does not include a plurality of edge points sufficiently separated from one another, it is possible to appropriately calculate information relating to the traveling lane.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a preferred embodiment will be described in detail referring to the drawings.

As shown in FIGS. 1 to 4, an information calculation device 1 is mounted in a vehicle V, such as a passenger vehicle. The information calculation device 1 is a device which calculates information relating to a traveling lane where the vehicle V travels based on a captured image P in front of the vehicle V. The captured image P is an image captured by a monocular camera 3 mounted in the vehicle V. The information calculation device 1 executes Kalman filter processing determined in advance in the above-described calculation. The Kalman filter processing will be described below in detail.

Figure 2:
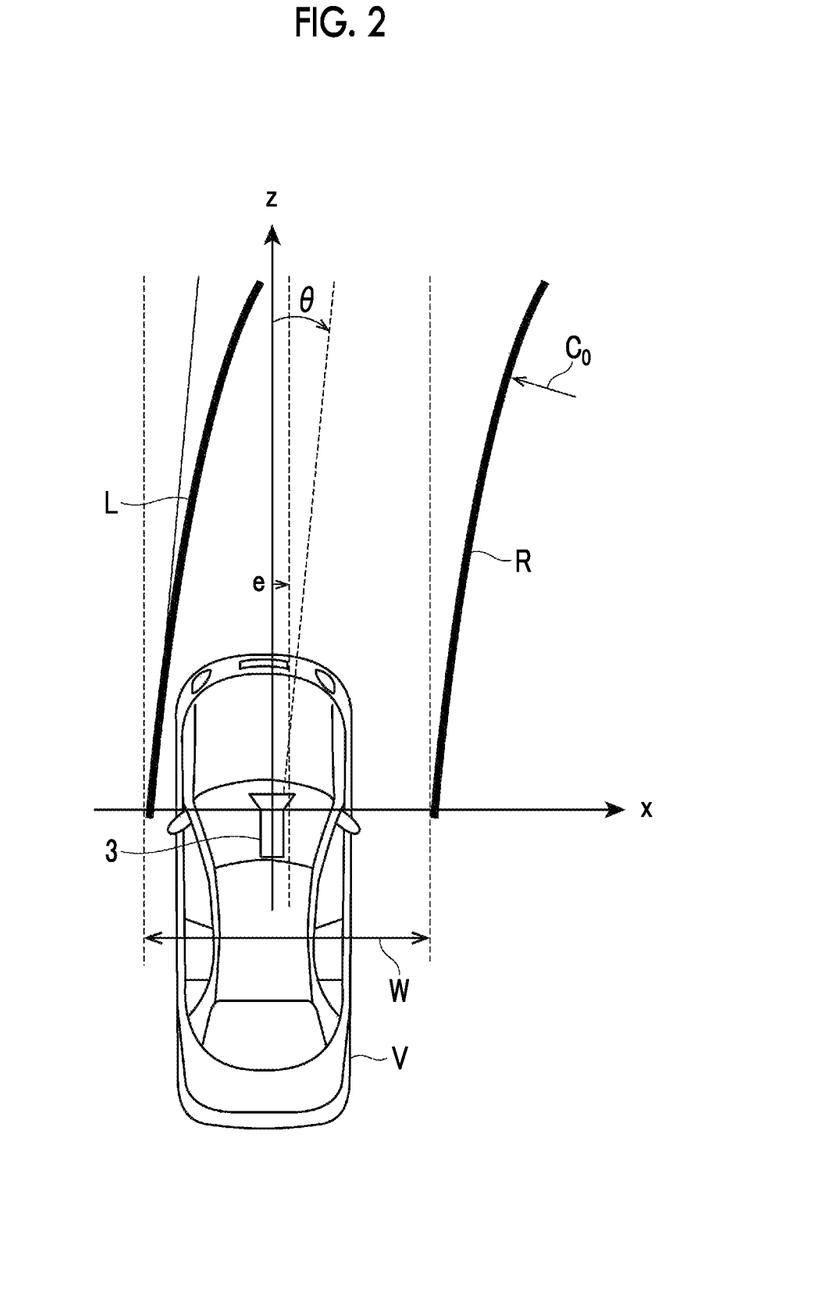
FIG. 2 is a plan view illustrating information relating to a traveling lane.
Figure 3:
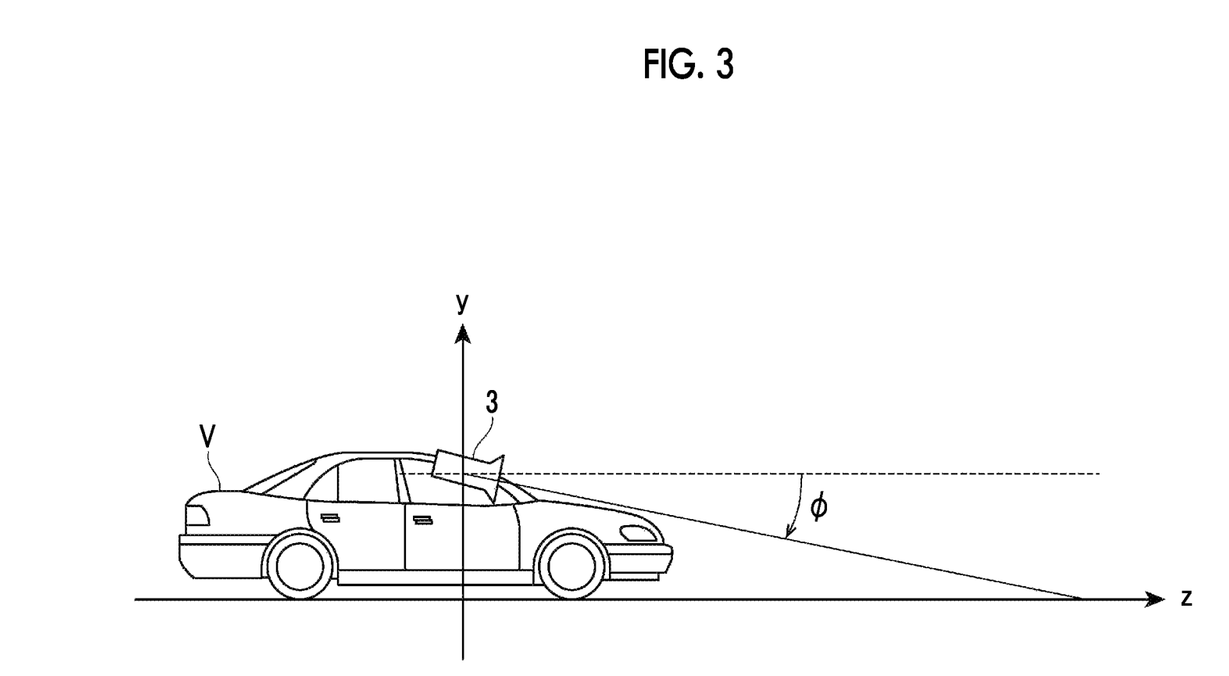
FIG. 3 is a side view illustrating information relating to a traveling lane.

FIG. 2 shows the vehicle V, a right lane marker R, and a left lane marker L. The left lane marker L is a lane marker on a left side of the vehicle V in a traveling lane where the vehicle V travels. The right lane marker R is a lane marker on a right side of the vehicle V in the traveling lane where the vehicle V travels. In the captured image P, the right lane marker R and the left lane marker L are captured respectively. In FIG. 2, a vehicle width direction of the vehicle V is referred to as an x-axis direction, and a traveling direction of the vehicle V is referred to as a z-axis direction. In FIG. 3, a height direction of the vehicle V is referred to as a y-axis direction.

As shown in FIGS. 2 and 3, information relating to the traveling lane includes parameters relating to the vehicle V and parameters relating to the lane. Examples of the parameters relating to the vehicle V include a lateral position e of the vehicle V in the traveling lane, a pitch angle $\phi$ of the vehicle V with respect to the traveling lane, and a yaw angle $\theta$ of the vehicle V with respect to the traveling lane. The lateral position e of the vehicle V in the traveling lane is a lateral position of the vehicle V with respect to the left lane marker L. The pitch angle $\phi$ of the vehicle V with respect to the traveling lane is an angle between a line parallel with a road surface of the traveling lane where the vehicle V travels and an optical axis of the monocular camera 3 provided in the vehicle V on a yz plane (a plane formed by the y axis and the z axis) shown in FIG. 3. The yaw angle $\theta$ of the vehicle V with respect to the traveling lane is an angle between an extension direction of the traveling lane where the vehicle V travels and the optical axis of the monocular camera 3 provided in the vehicle V on an xz plane (a plane formed by the x axis and the z axis) shown in FIG. 2. Examples of the parameter relating to the road include a lane width W of the traveling lane, a curvature $c_0$ of the traveling lane in front of the vehicle V, and a curvature change rate $c_1$ as a rate of change of the curvature $c_0$. Information relating to the traveling lane calculated by the information calculation device 1 is used for driving assist control in a known driving assist system mounted in the vehicle V as an example.

Figure 1:
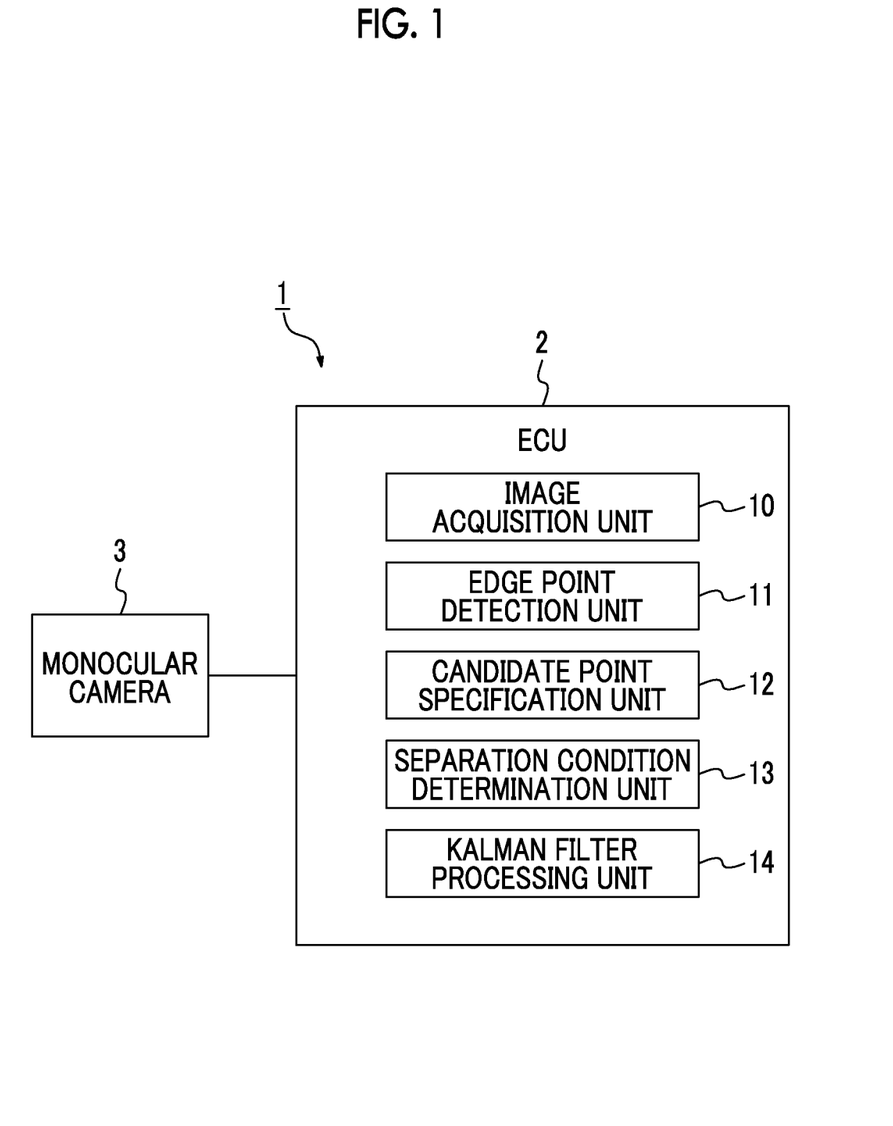
FIG. 1 is a block diagram showing an information calculation device according to this embodiment.

Hereinafter, the configuration of the information calculation device 1 according to this embodiment will be described referring to the drawings. As shown in FIG. 1, the information calculation device 1 includes an electronic control unit 2 (ECU 2) which integrally controls the device. The ECU 2 is an electronic control unit having a central processing unit (CPU), a read only memory (ROM), a random access memory (RAM), and the like. The ECU 2 is connected to the monocular camera 3.

The monocular camera 3 is an imaging device which is mounted in the vehicle V and captures an image in front of the vehicle V. The monocular camera 3 is provided on a rear side of a front glass of the vehicle V. The monocular camera 3 transmits imaging information relating to the captured image P in front of the vehicle V to the ECU 2.

Next, the functional configuration of the ECU 2 will be described. As shown in FIG. 1, the ECU 2 has an image acquisition unit 10, an edge point detection unit 11, a candidate point specification unit 12, a separation condition determination unit 13, and a Kalman filter processing unit 14.

Figure 4:
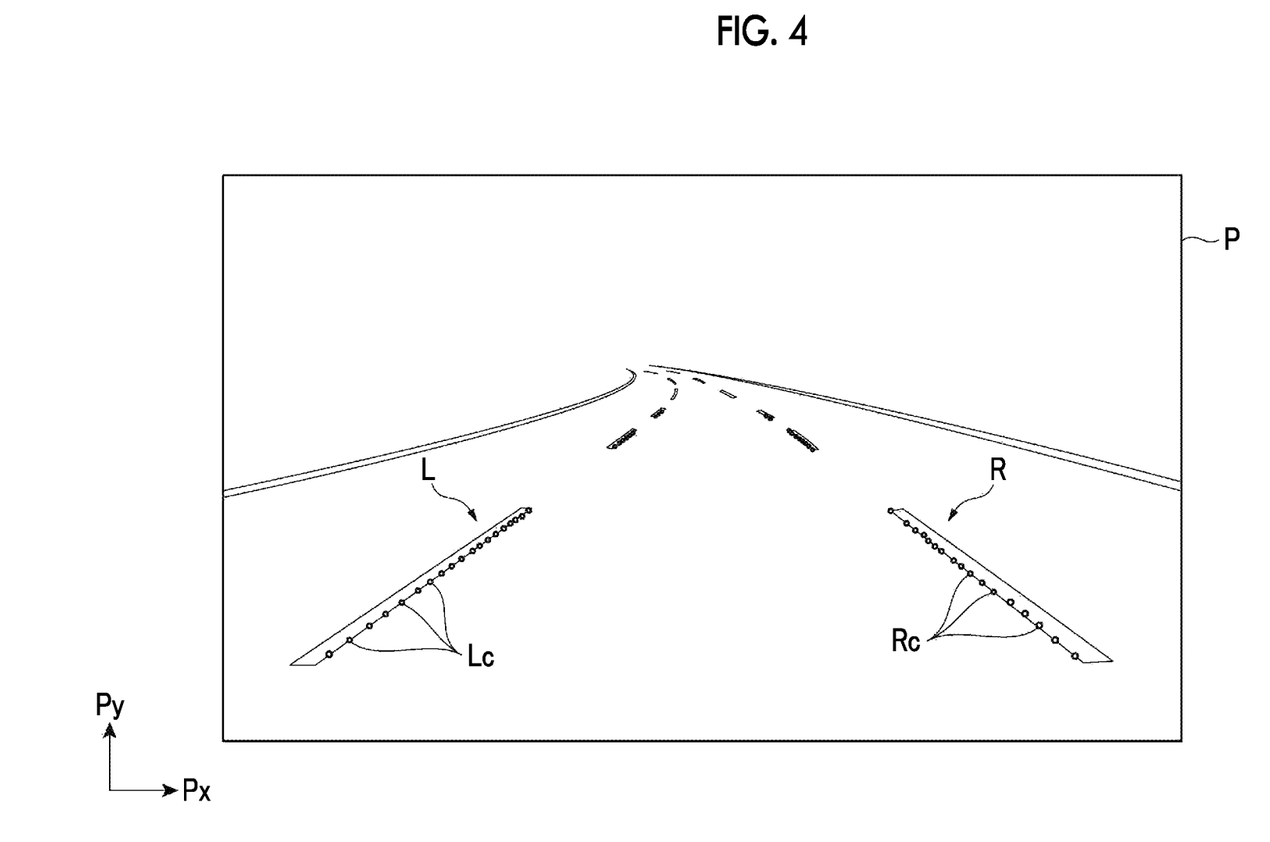
FIG. 4 is a diagram showing a captured image in front of a vehicle.

The image acquisition unit 10 acquires the captured image P captured by the monocular camera 3 from the imaging information of the monocular camera 3. A captured image P shown in FIG. 4 shows lane markers (lane boundary line, vehicle traffic zone line, or the like) forming the traveling lane of the vehicle V. Specifically, in the captured image P, as the lane markers, a left lane marker L as a lane marker on the left side of the vehicle V in the traveling lane and a right lane marker R as a lane marker on the right side of the vehicle V in the traveling lane are shown. The right lane marker R and the left lane marker L constitute the traveling lane.

In FIG. 4, a right-left direction (horizontal direction) of the captured image P is referred to as a Px-axis direction, and an up-down direction (vertical direction) of the captured image P is referred to as a Py-axis direction. Values of PxPy coordinates in a PxPy coordinate system formed by the Px axis and the Py axis are set in units of pixels constituting the captured image P. The PxPy coordinate system is set with a pixel at a lower left corner of the captured image P as an origin (Px, Py: 0, 0). The same applies to FIGS. 5 and 6 described below.

The edge point detection unit 11 detects edge points in the captured image P acquired by the image acquisition unit 10. The edge points are a rising edge point where a brightness value of the captured image P in a scanning direction of the captured image P rapidly increases and a falling edge point where the brightness value rapidly decreases.

Specifically, the edge point detection unit 11 acquires brightness information relating to the brightness value based on the captured image P acquired by the image acquisition unit 10 by a known method. The brightness information is information of the brightness value of each pixel of the captured image P. The edge point detection unit 11 detects edge points by performing edge point detection processing based on the brightness information in the captured image P. The edge point detection unit 11 detects edge points by scanning the captured image P in the horizontal direction. The edge point detection unit 11 detects, as edge points, pixels where the difference in brightness value from an adjacent pixel in the horizontal direction is equal to or greater than a predetermined threshold.

The candidate point specification unit 12 specifies left lane marker candidate points Lc as edge points of a left lane marker L and right lane marker candidate points Rc as edge points of a right lane marker R based on the edge points in the captured image P detected by the edge point detection unit 11. The left lane marker candidate points Lc are edge points positioned at a right end (an end on the traveling lane side) of the left lane marker L among the edge points corresponding to the left lane marker L. The right lane marker candidate points Rc are edge points positioned at a left end (an end on the traveling lane side) of the right lane marker R among the edge points corresponding to the right lane marker R.

The candidate point specification unit 12 specifies the right lane marker candidate points Rc and the left lane marker candidate points Lc by pattern recognition on the edge points in the captured image P. The candidate point specification unit 12 performs pattern recognition using image patterns of the right lane marker candidate points Rc and the left lane marker candidate points Lc stored in advance in the ECU 2. The candidate point specification unit 12 is not limited to pattern recognition and may specify the right lane marker candidate points Rc and the left lane marker candidate points Lc by other known methods.

The separation condition determination unit 13 determines whether or not each of the right lane marker candidate points Rc and the left lane marker candidate points Lc include two edge points satisfying separation conditions set in advance. The "two edge points satisfying the separation conditions set in advance" mean two edge points sufficiently separated from each other in the vertical direction (Py-axis direction) of the captured image P. The "separation conditions set in advance" are satisfied in a case where two points in an actual traveling lane corresponding to two edge points on the captured image P are separated from each other at a predetermined distance (for example, 20 m) or more in the extension direction (z-axis direction, see FIG. 2) of the traveling lane.

The separation condition determination unit 13 calculates the coordinates (the coordinates of the xz coordinate system) of the points (the points corresponding to the edge points) of the actual traveling lane from the coordinates of the edge points (the coordinates of the PxPy coordinate system) on the captured image P for the edge points included in the right lane marker candidate points Rc and the left lane marker candidate points Lc. The ECU 2 stores the correspondence relationship between the coordinates of the PxPy coordinate system for the captured image P and the coordinates of the xz coordinate system for the actual traveling lane as coordinate conversion data in advance. The separation condition determination unit 13 calculates the coordinates of each point of the actual traveling lane corresponding to each edge point from the coordinates of each of the edge points on the captured image P included in the right lane marker candidate points Rc and the left lane marker candidate points Lc using coordinate conversion data stored in advance in the ECU 2.

The separation condition determination unit 13 determines whether or not the left lane marker candidate points Lc include two edge points corresponding to two points where the distance between the two edge points in the extension direction of the traveling lane is equal to or greater than a predetermined distance based on the coordinates of each point of the actual traveling lane corresponding to each of the edge points included in the left lane marker candidate points Lc. In a case where it is determined that the left lane marker candidate points Lc include the two edge points corresponding to the two point where the distance between the two edge points in the extension direction of the traveling lane is equal to or greater than the predetermined distance, the separation condition determination unit 13 determines that the left lane marker candidate points Lc include the two edge points satisfying the separation conditions set in advance. The separation condition determination unit 13 performs the same determination for the right lane marker candidate points Rc.

The separation condition determination unit 13 does not necessarily calculate the coordinates of each point of the actual traveling lane. For example, the ECU 2 may store the relationship between a combination of the coordinates of the two edge points on the captured image P and whether or not the two edge points pertaining to the combination satisfy the separation conditions as data for determination of the separation conditions in advance. In this case, the separation condition determination unit 13 can directly determine whether or not the left lane marker candidate points Lc include the two edge points satisfying the separation conditions from the coordinates of the edge points included in the left lane marker candidate points Lc using data for determination stored in advance in the ECU 2. The separation condition determination unit 13 may determine whether or not each of the right lane marker candidate points Rc and the left lane marker candidate points Lc include the two edge points satisfying the separation conditions by other known methods.

FIG. 4 shows a case where there are a sufficient number of right and left lane marker candidate points of a traveling lane. In the situation shown in FIG. 4, the separation condition determination unit 13 determines that each of the right lane marker candidate points Rc and the left lane marker candidate points Lc includes the two edge points satisfying the separation conditions.

Figure 5:
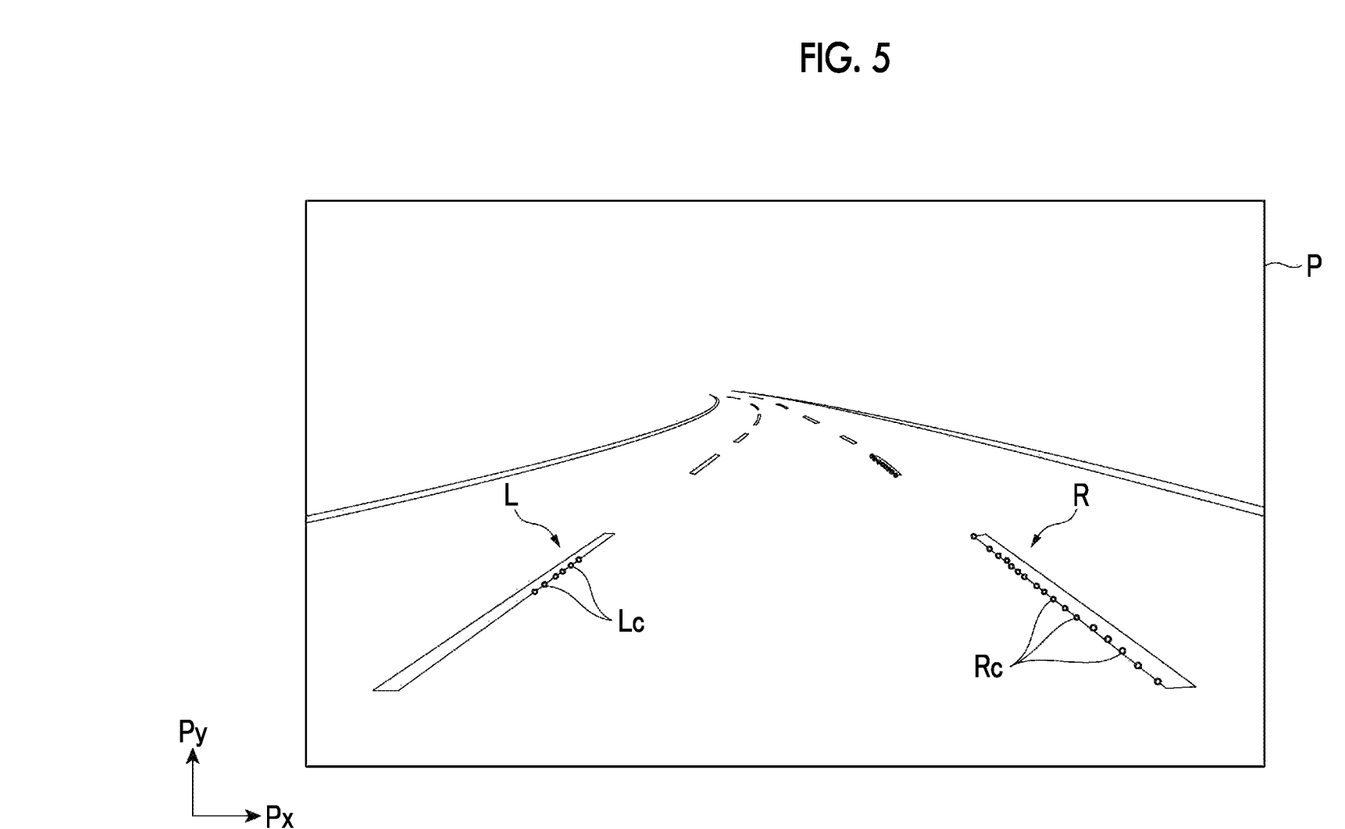
FIG. 5 is a diagram showing a case where left lane marker candidate points include at least one edge point and do not include two edge points satisfying separation conditions.

FIG. 5 shows a case where the left lane marker candidate points Lc include at least one edge point but do not include two edge points satisfying separation conditions. In FIG. 5, the right lane marker candidate points Rc include the two edge points satisfying the separation conditions. As shown in FIG. 5, there is a case where one of the right lane marker candidate points Rc and the left lane marker candidate points Lc can be sufficiently specified, but the other lane marker candidate points cannot be sufficiently specified due to blurring or the like of lane markers. The same situation occurs even in a case where either right or left lane marker is hidden by a preceding vehicle traveling in front of the vehicle V.

In the situation shown in FIG. 5, the separation condition determination unit 13 determines that the right lane marker candidate points Rc include the two edge points satisfying the separation conditions, and determines that the left lane marker candidate points Lc do not include the two edge points satisfying the separation conditions.

Figure 6:
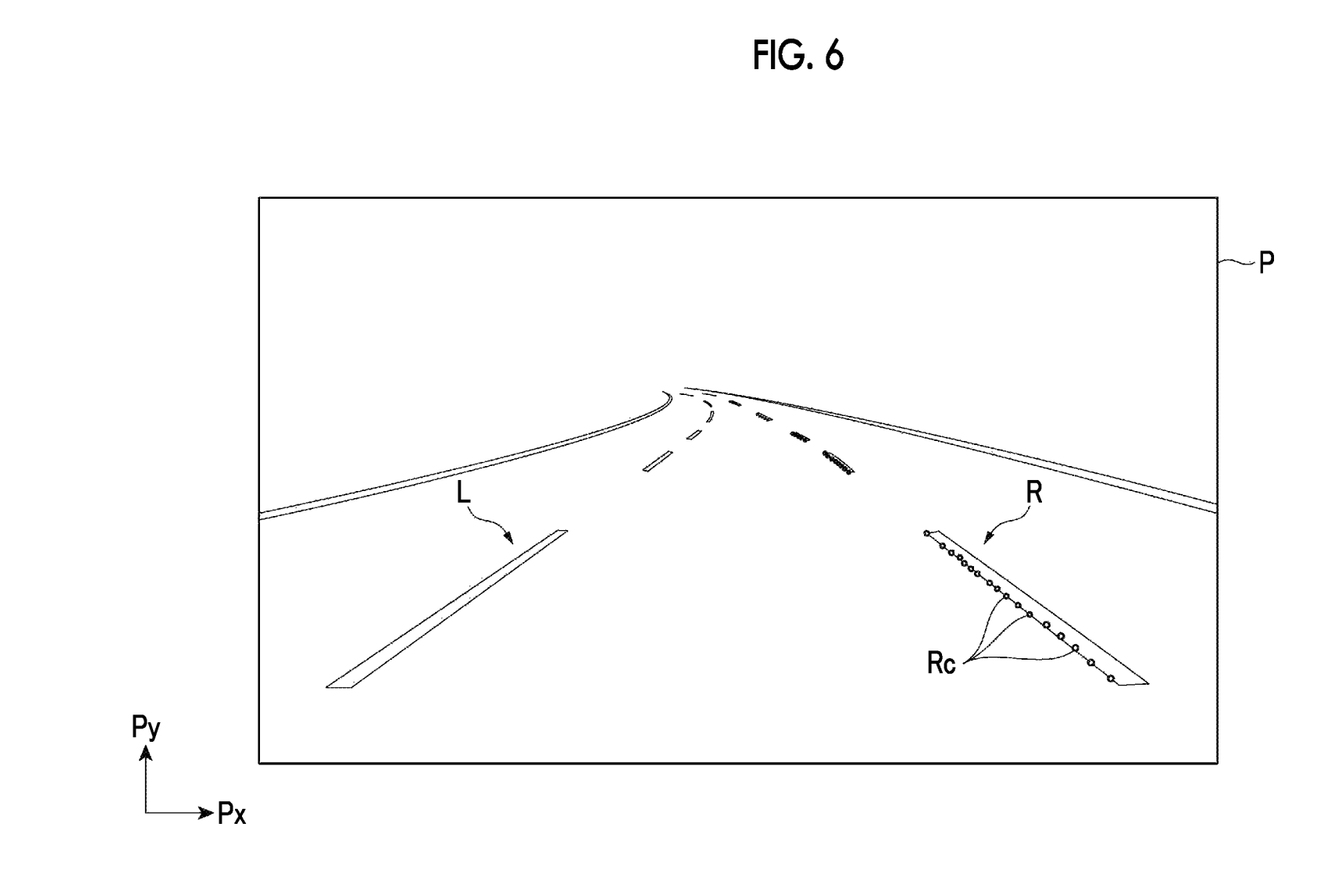
FIG. 6 is a diagram showing a case where left lane marker candidate points include no edge point.

In a case where it is determined that one of the right lane marker candidate points Rc and the left lane marker candidate points Lc include the two edge points satisfying the separation conditions, and the other lane marker candidate points do not include the two edge points satisfying the separation conditions, the separation condition determination unit 13 determines whether the other lane marker candidate points include no edge point or include at least one edge point. FIG. 6 shows a case where left lane marker candidate points include no edge point. In FIG. 6, the right lane marker candidate points Rc include two edge points satisfying separation conditions. In the situation shown in FIG. 6, the separation condition determination unit 13 determines that the left lane marker candidate points Lc include no edge point.

In the situation shown in FIG. 5, the separation condition determination unit 13 determines that the left lane marker candidate points Lc include at least one edge point. In this case, the left lane marker candidate points Lc are lane marker candidate points where at least one edge point are included and all edge points in the left lane marker candidate points Lc do not satisfy the separation conditions. That is, the lane marker candidate points which do not include the two edge points satisfying the separation conditions and include at least one edge point are the same as the lane marker candidate points where at least one edge point is included and all edge points in the other lane marker candidate points do not satisfy the separation conditions.

In a case where it is determined that each of the right lane marker candidate points Rc and the left lane marker candidate points Lc includes the two edge points satisfying the separation conditions, the Kalman filter processing unit 14 executes Kalman filter processing determined in advance. The Kalman filter processing unit 14 calculates information relating to the traveling lane based on the right lane marker candidate points Rc and the left lane marker candidate points Lc by the Kalman filter processing. The Kalman filter processing unit 14 calculates information (output values) relating to the traveling lane with the coordinates of the edge points on the captured image P included in the right lane marker candidate points Rc and the left lane marker candidate points Lc as input values (observation variables). The Kalman filter processing unit 14 outputs the lateral position e, the pitch angle ϕ, the yaw angle θ, the lane width W, the curvature $c_0$, and the curvature change rate $c_1$ described above as information relating to the traveling lane.

As the Kalman filter processing determined in advance, a method disclosed in a literature, Akihiro WATANABE, Takashi NAITO, Yoshiki NINOMIYA, "Lane detection with Roadside structure using on-board monocular camera", Intelligent Vehicles Symposium, 2009 IEEE, June 2009, p. 191-196, is known.

The Kalman filter processing unit 14 can execute Kalman filter processing using following Expressions (1) to (3) described in the above-described literature. In Expression (1), t represents time, and x(t) represents a state variable at the time t. The state variable x corresponds to information relating to the traveling lane described above as shown in Expression (1). Respective parameters at the time t are represented by attaching a subscript t to the reference numeral. Information relating to the traveling lane at the time t is represented as a lateral position $e_t$, a pitch angle $\phi_t$, a yaw angle $\theta_t$, a lane width $W_t$, a curvature $c_{0,t}$, and a curvature change rate $c_{1,t}$. Expression (1) associates x(t) with information relating to the traveling lane at the time t. Expressions (2) and (3) are transition model expressions of the Kalman filter processing. In Expression (2), $w_t$ is a predetermined value representing an error. $A_t$ of Expression (2) is defined by Expression (3). In Expression (3), $dz_t$ is a temporal change of the coordinates in the z-axis direction (the traveling direction of the vehicle V) of the xz coordinate system at the time t. $dz_t$ can be determined from a vehicle speed of the vehicle V.

$$x(t) = (W_t, e_t, \theta_t, c_{0,t}, c_{1,t}, \phi_t) \tag{1}$$

$$x_{t+1} = A_t x_t + w_t \tag{2}$$

$$A_t = \begin{pmatrix} 1 & dz_t & \frac{1}{2}dz_t^2 & \frac{1}{6}dz_t^3 & 0 & 0 \\ 0 & 1 & dz_t & \frac{1}{2}dz_t^2 & 0 & 0 \\ 0 & 0 & 1 & dz_t & 0 & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix} \tag{3}$$

Next, an observation variable z of a Kalman filter will be described. The observation variable z corresponds to the coordinates (the coordinates of the PxPy coordinate system) of each of the edge points of the right lane marker candidate points Rc and the left lane marker candidate points Lc on the captured image P. The observation variable z and the state variable x have a correspondence relationship. That is, if the state variable x is known, the horizontal coordinates (Px coordinates) of the left lane marker candidate points Lc in the vertical coordinates (Py coordinates) on the captured image P are determined uniquely. For this reason, the observation variable z can be represented by Expression (4) described below. The Kalman filter processing becomes Jacobian of H=h(x) for a function which becomes Expression (4).

$$z = h(x) \tag{4}$$

The Kalman filter processing unit 14 calculates the state variable x from the observation variable z by the Kalman filter processing using Expressions (1) to (4) described above. That is, the Kalman filter processing unit 14 calculates information (lateral position $e_t$, pitch angle $\phi_t$, yaw angle $\theta_t$, lane width $W_t$, curvature $c_{0,t}$, and curvature change rate $c_{1,t}$) relating to the traveling lane from the coordinates (the coordinates of the PxPy coordinate system) of each of the edge points of the left lane marker candidate points Lc and the right lane marker candidate point Rc. The Kalman filter processing according to the disclosure needs not to be limited to the Kalman filter processing described above.

Next, the Kalman filter processing in the situation shown in FIG. 5 will be described. As shown in FIG. 5, in a case where it is determined that the right lane marker candidate points Rc include the two edge points satisfying the separation conditions and it is determined that the left lane marker candidate points Lc include at least one edge point but do not include the two edge points satisfying the separation conditions, the Kalman filter processing unit 14 sets a first constraint condition. The first constraint condition is a constraint condition for which the pitch angle $\phi_t$ is set to zero.

In this case, the Kalman filter processing unit 14 executes the Kalman filter processing described above by applying the first constraint condition. The Kalman filter processing unit 14 calculates information relating to the traveling lane by executing the Kalman filter processing with the coordinates of the edge points (the coordinates of the PxPy coordinate system) on the captured image P included in the right lane marker candidate points Rc and the left lane marker candidate points Lc and the pitch angle $\phi_t$ having a value of zero as input values.

Subsequently, the Kalman filter processing in the situation shown in FIG. 6 will be described. As shown in FIG. 6, in a case where it is determined that the right lane marker candidate points Rc include the two edge points satisfying the separation conditions and it is determined that the left lane marker candidate points Lc include no edge point, the Kalman filter processing unit 14 sets a second constraint condition. The second constraint condition is a constraint condition for which the pitch angle $\phi_t$ is set to zero and the lane width $W_t$ is set to a predetermined value. The predetermined value can be a fixed value. In a case where the lane width W is already calculated by the Kalman filter processing, the value (last value) of the latest calculated lane width W may be set as the predetermined value.

In this case, the Kalman filter processing unit 14 executes the Kalman filter processing described above by applying the second constraint condition. The Kalman filter processing unit 14 calculates information relating to the traveling lane by executing the Kalman filter processing with the coordinates (the coordinates of the PxPy coordinate system) of the edge points on the captured image P included in the right lane marker candidate points Rc, the pitch angle $\phi_t$ having a value of zero, and the lane width $W_t$ having the predetermined value.

Figure 7:
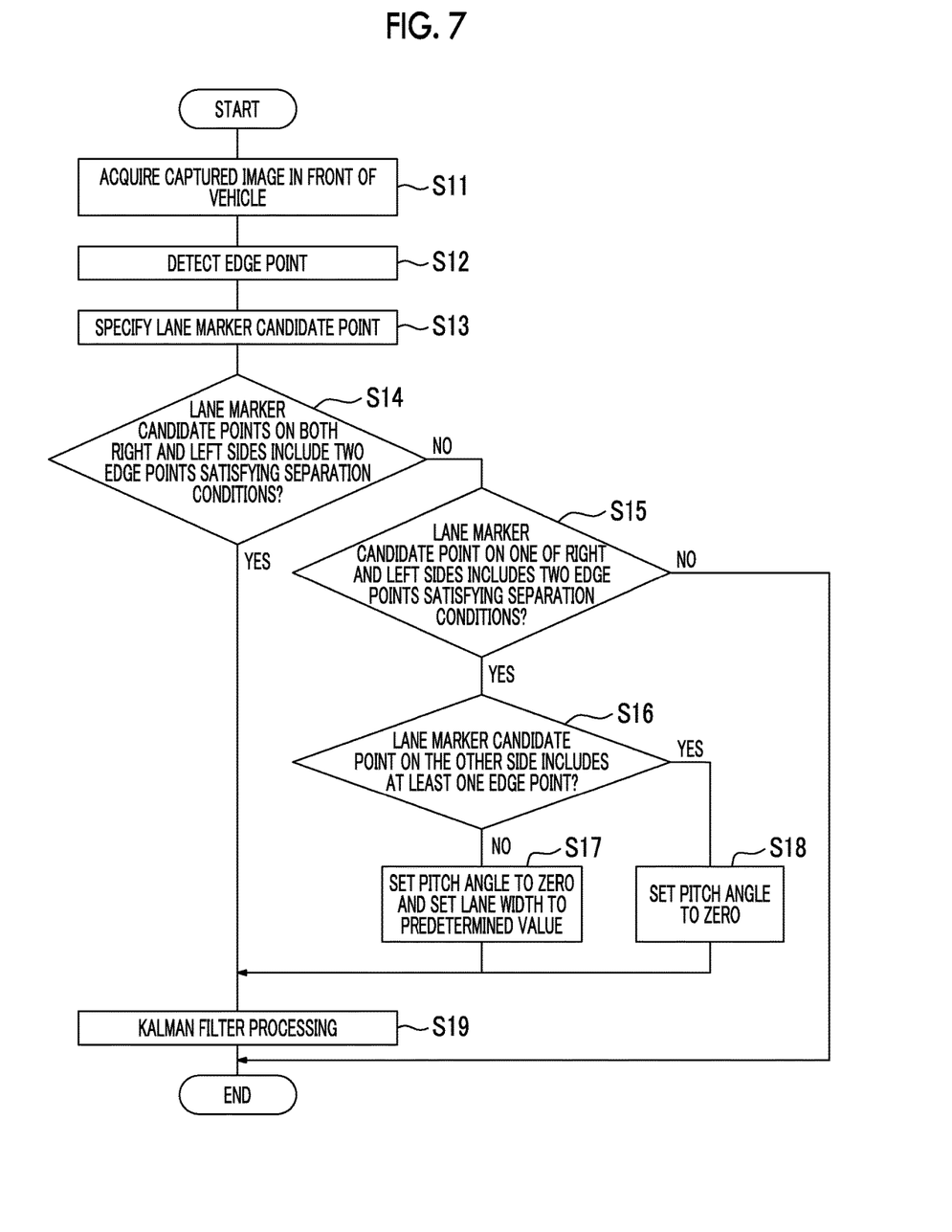
FIG. 7 is a flowchart showing information calculation processing of the information calculation device according to this embodiment.

Next, information calculation processing by the information calculation device 1 will be described. FIG. 7 is a flowchart showing information calculation processing of the information calculation device according to this embodiment. The processing of the flowchart shown in FIG. 7 is executed by the ECU 2 in a case where the driving assist system of the vehicle V is operated as an example. The ECU 2 repeats the processing from the start again in a case where the processing of the flowchart shown in FIG. 7 ends (the process reaches the end). The ECU 2 ends the information calculation processing even in the middle in a case where the driving assist system of the vehicle V ends.

As shown in FIG. 7, in Step S11, the ECU 2 acquires the captured image P in front of the vehicle V captured by the monocular camera 3 using the image acquisition unit 10. The image acquisition unit 10 acquires the captured image P captured by the monocular camera 3 from the imaging information of the monocular camera 3. In a case where the image acquisition unit 10 acquires the captured image P, the ECU 2 progresses to Step S12.

In Step S12, the ECU 2 detects the edge points in the captured image P using the edge point detection unit 11. Specifically, the edge point detection unit 11 detects the edge points by performing a known edge point detection processing based on the brightness information included in the captured image P acquired by the image acquisition unit 10. In a case where the edge points are detected, the ECU 2 progresses to Step S13.

In Step S13, the ECU 2 specifies the right lane marker candidate points Rc and the left lane marker candidate points Lc based on the edge points in the captured image P using the candidate point specification unit 12. The candidate point specification unit 12 specifies the right lane marker candidate points Rc and the left lane marker candidate points Lc by extracting the edge points constituting the left lane marker L and the right lane marker R through pattern recognition on the edge points in the captured image P. In a case where the lane marker candidate points are specified, the ECU 2 progresses to Step S14.

In Step S14, the ECU 2 determines whether or not each of the right lane marker candidate points Rc and the left lane marker candidate points Lc include the two edge points satisfying the separation conditions set in advance using the separation condition determination unit 13. The separation condition determination unit 13 calculates the coordinates of each edge point of the actual traveling lane from the coordinates of each of the edge points on the captured image P included in the right lane marker candidate points Rc and the left lane marker candidate points Lc using coordinate conversion data stored in advance in the ECU 2. The separation condition determination unit 13 performs the above-described determination based on the coordinates of each point of the actual traveling lane corresponding to each edge point included in the left lane marker candidate points Lc.

In a case where the separation condition determination unit 13 determines that the right lane marker candidate points Rc and the left lane marker candidate points Lc include the two edge points satisfying the separation conditions (S14: YES), the ECU 2 progresses to Step S19.

In a case where the separation condition determination unit 13 determines that the right lane marker candidate points Rc and the left lane marker candidate points Lc do not include the two edge points satisfying the separation conditions (S14: NO), the ECU 2 progresses to Step S15.

In Step S15, the ECU 2 determines whether or not one of the right and left lane marker candidate points (left lane marker candidate points Lc or the right lane marker candidate points Rc) includes the two edge points satisfying the separation conditions using the separation condition determination unit 13. In a case where it is determined that one of the right and left lane marker candidate points does not include the two edge points satisfying the separation conditions (S15: NO), the ECU 2 ends the information calculation processing shown in FIG. 7 (the process reaches the end of the flowchart).

In Step S15, in a case where it is determined that one of the right and left lane marker candidate points includes the two edge points satisfying the separation conditions (S15: YES), the ECU 2 progresses to Step S16.

In Step S16, the ECU 2 determines whether the other lane marker candidate points include no edge point or include at least one edge point using the separation condition determination unit 13. In a case where it is determined that the other lane marker candidate points include no edge point (S16: NO), the ECU 2 progresses to Step S17. In a case where it is determined that the other lane marker candidate points include at least one edge point (S16: YES), the ECU 2 progresses to Step S18.

In Step S17, the ECU 2 sets the second constraint condition (for which the pitch angle $\phi$ is set to zero and the lane width W is set to the predetermined value) for the Kalman filter processing in the Kalman filter processing unit 14. The second constraint condition is unset if the Kalman filter processing is executed once. In a case where the second constraint condition is set, the ECU 2 progresses to Step S19.

In Step S18, the ECU 2 sets the first constraint condition (for which the pitch angle $\phi$ is set to zero) for the Kalman filter processing in the Kalman filter processing unit 14. The first constraint condition is unset if the Kalman filter processing is executed once. In a case where the first constraint condition is set, the ECU 2 progresses to Step S19.

In Step S19, the ECU 2 executes the Kalman filter processing determined in advance using the Kalman filter processing unit 14. The Kalman filter processing unit 14 calculates information (lateral position e, pitch angle $\phi$, yaw angle $\theta$, lane width W, curvature $c_0$, and curvature change rate $c_1$) relating to the traveling lane based on the coordinates of the edge points on the captured image P included in the right lane marker candidate points Rc and the left lane marker candidate points Lc through the Kalman filter processing in a case where the first constraint condition or the second constraint condition is not set. The Kalman filter processing unit 14 calculates information relating to the traveling lane from the coordinates (the coordinates of the PxPy coordinate system) of the edge points on the captured image P included in the right lane marker candidate points Rc and the left lane marker candidate points Lc through the Kalman filter processing using Expressions (1) to (4) described above.

The Kalman filter processing unit 14 calculates information relating to the traveling lane by executing the Kalman filter processing with the coordinates of the edge points (the coordinates of the PxPy coordinate system) on the captured image P included in the right lane marker candidate points Rc and the left lane marker candidate points Lc and the pitch angle $\phi$ having a value of zero as input values in a case where the first constraint condition is set.

The Kalman filter processing unit 14 calculates information relating to the traveling lane by executing the Kalman filter processing with the coordinates of the edge points on the captured image P included in the right lane marker candidate points Rc and the left lane marker candidate points Lc, the pitch angle $\phi$ having a value of zero, and the lane width W having the predetermined value as input values in a case where the second constraint condition is set. In a case where the Kalman filter processing is executed, the ECU 2 ends the information calculation processing shown in FIG. 7.

According to the information calculation device 1 of this embodiment described above, even in a case where the two edge points satisfying the separation conditions set in advance are not included in each of the right lane marker candidate points Rc and the left lane marker candidate points Lc, when the two edge points satisfying the separation conditions are included in one of the right lane marker candidate points Rc and the left lane marker candidate points Lc and the other lane marker candidate points include no edge point, the Kalman filter processing is executed by applying a constraint condition for which the pitch angle $\phi$ of the vehicle V is set to zero and the lane width W of the traveling lane is set to the predetermined value. Therefore, according to this information calculation device 1, even in a case where one of the right lane marker candidate points Rc and the left lane marker candidate points Lc can specify no edge point, it is possible to appropriately calculate information relating to the traveling lane.

According to the information calculation device 1, even in a case where the two edge points satisfying the separation conditions set in advance are not included in each of the right lane marker candidate points Rc and the left lane marker candidate points Lc, when the two edge points satisfying the separation conditions are included in one of the right lane marker candidate points Rc and the left lane marker candidate points Lc, at least one edge point is included in the other lane marker candidate points, and all edge points in the other lane marker candidate points do not satisfy the separation conditions, the Kalman filter processing is executed by applying a constraint condition for which the pitch angle $\phi$ of the vehicle V is set to zero. Therefore, according to this information calculation device 1, even in a case where the two edge points satisfying the separation conditions are not included in one of the right lane marker candidate points Rc and the left lane marker candidate points Lc where at least one edge point is specified, it is possible to appropriately calculate information relating to the traveling lane.

Although the embodiment of the disclosure has been described as above, the disclosure is not limited to the embodiment described above. The disclosure may be subjected to various modifications and improvements based on common knowledge of those skilled in the art including the embodiment described above.

For example, in the information calculation device 1, the Kalman filter processing unit 14 needs not to be able to execute both of the Kalman filter processing to which the first constraint condition is applied and the Kalman filter processing to which the second constraint condition is applied, may be configured to be able to execute only one thereof. That is, the Kalman filter processing unit 14 may not execute the Kalman filter processing in a case where the two edge points satisfying the separation conditions are included in one of the right lane marker candidate points Rc and the left lane marker candidate points Lc, at least one edge point is included in the other lane marker candidate points, and all edge points in the other lane marker candidate points do not satisfy the separation conditions. In this case, the Kalman filter processing unit 14 needs not to set the second constraint condition. Furthermore, in this case, in the flowchart shown in FIG. 7, the processing of S15 and S18 is omitted, and in a case where the determination result in S16 is YES, the process does not reach S19 and the information calculation processing ends.

Similarly, the Kalman filter processing unit 14 may not execute the Kalman filter processing in a case where the two edge points satisfying the separation conditions are included in one of the right lane marker candidate points Rc and the left lane marker candidate points Lc and the other lane marker candidate points include no edge point. In this case, the Kalman filter processing unit 14 needs not to set the first constraint condition. In addition, in this case, in the flowchart shown in FIG. 7, the processing of S17 is omitted, and in a case where the determination result in S16 is NO, the process does not reach S19 and the information calculation processing ends.

What is claimed is:

1. An information calculation device which calculates information relating to a traveling lane where a vehicle travels based on a captured image in front of the vehicle captured by a monocular camera mounted in the vehicle, the information calculation device comprising:
- an electronic control unit configure to
  - i) detect edge points in the captured image,
  - ii) specify left lane marker candidate points as the edge points of a lane marker on a left side of the vehicle in the traveling lane and right lane marker candidate points as the edge points of a lane marker on a right side of the vehicle in the traveling lane based on the edge points, and
  - iii) calculate a lateral position of the vehicle in the traveling lane, a pitch angle of the vehicle with respect to the traveling lane, a yaw angle of the vehicle with respect to the traveling lane, a lane width of the traveling lane, a curvature of the traveling lane in front of the vehicle, and a curvature change rate as a rate of change of the curvature based on the right lane marker candidate points and the left lane marker candidate points by Kalman filter processing determined in advance when two edge points satisfying separation conditions set in advance are included in each of the right lane marker candidate points and the left lane marker candidate points,
- the electronic control unit being configured to, in response to the two edge points satisfying the separation conditions being included in one of the right lane marker candidate points and the left lane marker candidate points and no edge point is included in the other one of the right lane marker candidate points and the left lane marker candidate points, set the pitch angle of the vehicle to zero and to set the lane width of the traveling lane to a predetermined value and to calculate the lateral position, the yaw angle, the curvature, and the curvature change rate based on one of the right lane marker candidate points and the left lane marker candidate points by the Kalman filter processing.

2. The information calculation device according to claim 1,
- wherein the electronic control unit is configured to set the pitch angle of the vehicle to zero and to calculate the lateral position, the yaw angle, the lane width, the curvature, and the curvature change rate based on the right lane marker candidate points and the left lane marker candidate points by the Kalman filter processing when the two edge points satisfying the separation conditions are included in one of the right lane marker candidate points and the left lane marker candidate points, at least one edge point is included in the other lane marker candidate points, and all edge points in the other lane marker candidate points do not satisfy the separation conditions.

3. The information calculation device according to claim 1,
- wherein the electronic control unit is configured to detect edge points by performing known edge point detection processing based on brightness information included in the captured image.

4. The information calculation device according to claim 1,
- wherein the electronic control unit is configured to calculate coordinates of each point of an actual traveling lane corresponding to each edge point from coordinates of each edge point on the captured image included in the right lane marker candidate points and the left lane marker candidate points using coordinate conversion data stored in advance, and to determine whether or not the separation conditions are satisfied based on the coordinates of each point of the actual traveling lane corresponding to each edge point included in the right lane marker candidate points and the left lane marker candidate points.

5. An information calculation device which calculates information relating to a traveling lane where a vehicle travels based on a captured image in front of the vehicle captured by a monocular camera mounted in the vehicle, the information calculation device comprising:
- an electronic control unit configured to
  - i) detect edge points in the captured image,
  - ii) specify left lane marker candidate points as the edge points of a lane marker on a left side of the vehicle in the traveling lane and right lane marker candidate points as the edge points of a lane marker on a right side of the vehicle in the traveling lane based on the edge points, and
  - iii) calculate a lateral position of the vehicle in the traveling lane, a pitch angle of the vehicle with respect to the traveling lane, a yaw angle of the vehicle with respect to the traveling lane, a lane width of the traveling lane, a curvature of the traveling lane in front of the vehicle, and a curvature change rate as a rate of change of the curvature based on the right lane marker candidate points and the left lane marker candidate point by Kalman filter processing determined in advance when two edge points satisfying separation conditions set in advance are included in each of the right lane marker candidate points and the left lane marker candidate points,
- the electronic control unit being configured to, in response to the two edge points satisfying the separation conditions being included in one of the right lane marker candidate points and the left lane marker candidate points, at least one edge point being included in the other one of the right lane marker candidate points and the left lane marker candidate points, and all edge points in the other lane marker candidate points do not satisfy the separation conditions, set the pitch angle of the vehicle to zero and calculate the lateral position, the yaw angle, the lane width, the curvature, and the curvature change rate based on the right lane marker candidate points and the left lane marker candidate points by the Kalman filter processing.

6. The information calculation device according to claim 5,
- wherein the electronic control unit is configured to detect the edge points by performing known edge point detection processing based on brightness information included in the captured image.

7. The information calculation device according to claim 5,
- wherein the electronic control unit is configured to calculate coordinates of each point of an actual traveling lane corresponding to each edge point from coordinates of each edge point on the captured image included in the right lane marker candidate points and the left lane marker candidate points using coordinate conversion data stored in advance, and to determine whether or not the separation conditions are satisfied based on the coordinates of each point of the actual traveling lane corresponding to each edge point included in the right lane marker candidate points and the left lane marker candidate points.

* * * * *